Figure 1:
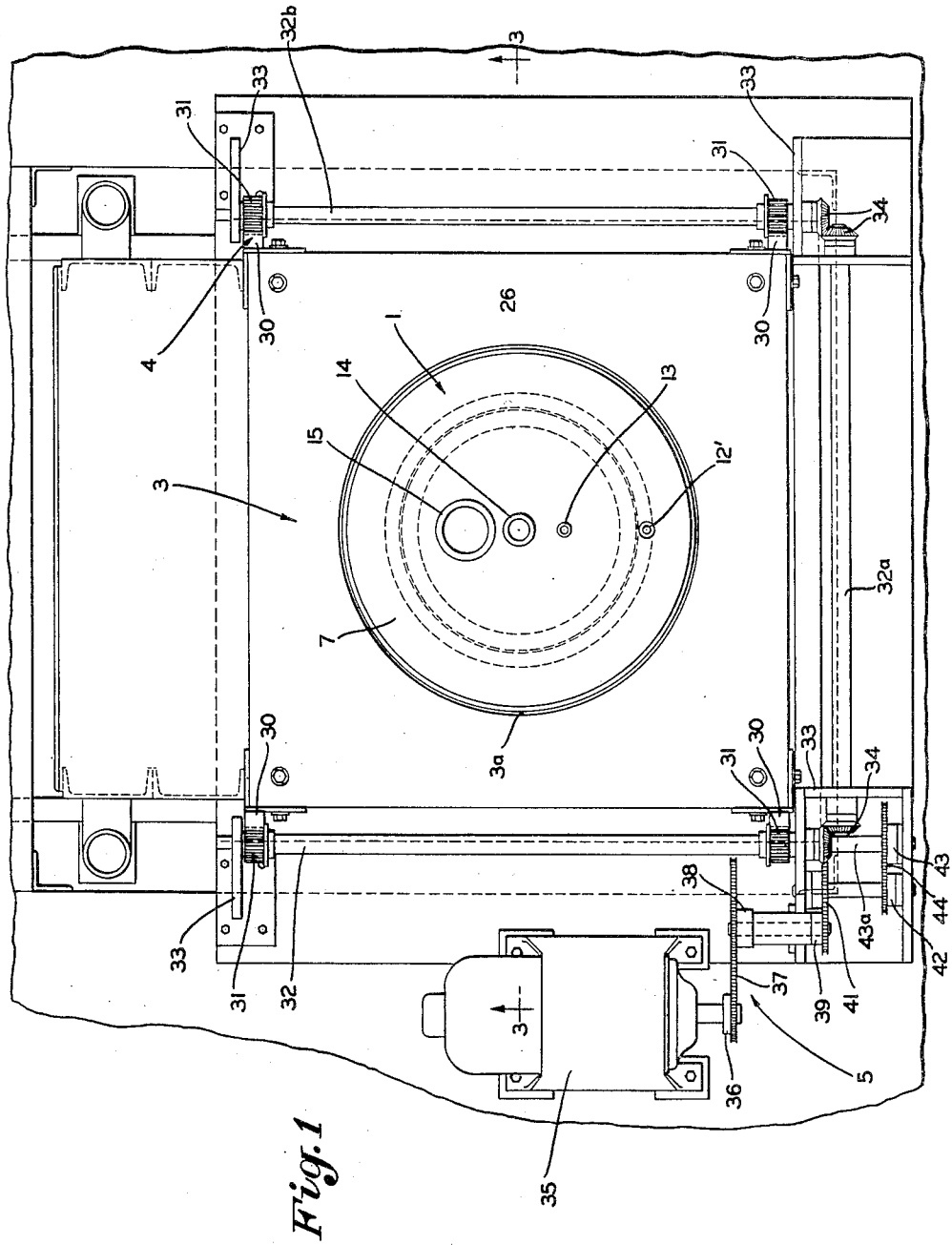

Feb. 5, 1957  R. M. SCRIVER  2,780,666
INDUCTION FURNACE CONTROL AND METHOD
Filed April 6, 1954  4 Sheets-Sheet 1

INVENTOR.
Richard M. Scriver
BY
Frease & Bishop
ATTORNEYS

United States Patent Office 2,780,666
Patented Feb. 5, 1957

2,780,666

INDUCTION FURNACE CONTROL AND METHOD

Richard M. Scriver, Niles, Ohio, assignor to Mallory-Sharon Titanium Corporation, Niles, Ohio, a corporation of Delaware Application April 6, 1954, Serial No. 421,338

7 Claims. (Cl. 13—26)

My invention relates to improvements in induction furnace control and method and more specifically to an induction furnace construction by which titanium may be efficiently melted with the resulting molten titanium containing a relatively low carbon content. Even more specifically my invention relates to an induction furnace for melting titanium in which a high frequency induction coil is reciprocably moved in reference to the heating or melting crucible during the heating cycle and until the titanium contained therein is in a molten state.

Some prior constructions of induction furnaces used for melting titanium have contained a cup-shaped graphite crucible in which an argon atmosphere is maintained and which is surrounded by an induction coil. In some cases, the crucible has been provided with a centrally located hole in its bottom wall in which a titanium metal plug is inserted.

The furnace crucible is filled with titanium sponge metal and the induction coil is located in a stationary position so as to heat the titanium metal in the upper portion of the crucible. This is done by locating the induction coil centrally of the portion of the crucible that it is desired to heat. After all of the titanium metal in the furnace but the lower few inches contained in the crucible is molten, the induction coil is moved downwardly to a position to heat the lower portion of the crucible and thus at the last of the heating cycle melt the metal contained in that portion.

As the titanium metal in the lower portion is melted the titanium plug located in the bottom of the crucible also melts allowing the molten titanium to flow downwardly into a heated mold positioned below the heating chamber, which mold also contains an argon atmosphere. When the total charge of titanium has been received in the mold, the mold is allowed to cool and the ingot of titanium may then be removed.

One difficulty with the prior induction furnaces for melting titanium metal has been that it was only possible to heat a narrow band of the crucible within the upper and lower ends of the surrounding induction coil, so that it has required a great amount of time to convert all of the titanium sponge to molten state. Since only a narrow band or portion of the crucible was heated, this particular band area was heated to a temperature far above the melting point of titanium, which is approximately 3170°. This was necessary in order to drive the heat upwardly and downwardly in the crucible and in the titanium metal contained therein to melt the charge.

This has created so-called hot spots in the crucible which not only reduce the life of the crucible, but also cause an increased carbon pickup in the titanium metal being melted therein. Carbon pickup is relatively rapid when molten titanium is in contact with graphite, such as heated graphite crucible walls. Also the higher temperature necessary to melt all of the titanium contained in the furnace requires the metal to be raised far above its melting point which thereby increase the necessary cooling time in the mold.

This increased melting time and increased cooling time has also made it necessary to use a great amount of argon in order to maintain the necessary argon atmospheres over the long heating and cooling cycle. Additionally, certain prior induction furnaces have used comparatively low frequency induction coils which are desirable for ease in balancing to a zero power factor, but which cause an increase in the hot spot trouble and carbon pickup.

It is therefore a general object of the present invention to provide an induction furnace construction for melting titanium metal which eliminates the difficulties of the prior constructions.

It is a primary object of the present invention to provide a means for uniformly heating a crucible containing titanium metal by use of a vertically reciprocably moving induction coil which moves throughout the heating cycle.

It is another object of the present invention to provide an induction furnace construction for heating titanium metal which eliminates the undesirable hot spots by uniformly heating the furnace by a high frequency induction coil.

It is still another object of the present invention to provide an induction furnace construction for heating titanium metal that does not require as high temperatures as heretofore necessary, and consequently reduces the heating time and cooling time as well as the amount of argon necessary to maintain an argon atmosphere therein.

It is a further object of the present invention to provide an induction furnace in which it is possible to heat titanium metal with a smaller amount of carbon pickup than has heretofore been possible.

Finally it is an object of the present invention to provide an induction furnace for heating titanium metal which provides greater crucible life.

These and other objects are accomplished by the parts, constructions, arrangements, combinations and sub-combinations comprising the present invention, the nature of which is set forth in the following general statement, a preferred embodiment of which—illustrative of the best mode of which applicant has contemplated applying the principles—is set forth in the following description and illustrated in the accompanying drawings and which is particularly and distinctly pointed out and set forth in the appended claims forming a part hereof.

In general terms the improved induction furnace construction for melting titanium metal may be stated as including a graphite crucible, an induction coil surrounding the crucible, and means for continuously reciprocally axially moving the induction coil in relation to the crucible.

More specifically, the improved induction furnace construction for melting titanium metal may be stated as including a vertical cylindrical graphite crucible having an argon atmosphere maintained therein, an induction coil peripherally surrounding the crucible mounted on a frame, gear racks axially mounted on the frame, gear pinions mounted separately of the frame and engaging the gear racks, and drive means selectively rotating the gear pinions first in one direction and then in the other direction; whereby the induction coil and mounting frame are selectively moved reciprocally axially of the vertical height of the crucible to progressively heat selected portions of the crucible and bring titanium sponge metal being heated therein to melting temperature at the same time substantially throughout.

By way of example an embodiment of the induction furnace construction of the present invention is illustrated in the accompanying drawings forming a part hereof, wherein like numerals indicate similar parts throughout the several views and in which:

Fig. 1 is a top elevation of the improved induction furnace of the present invention.

Figure 2:
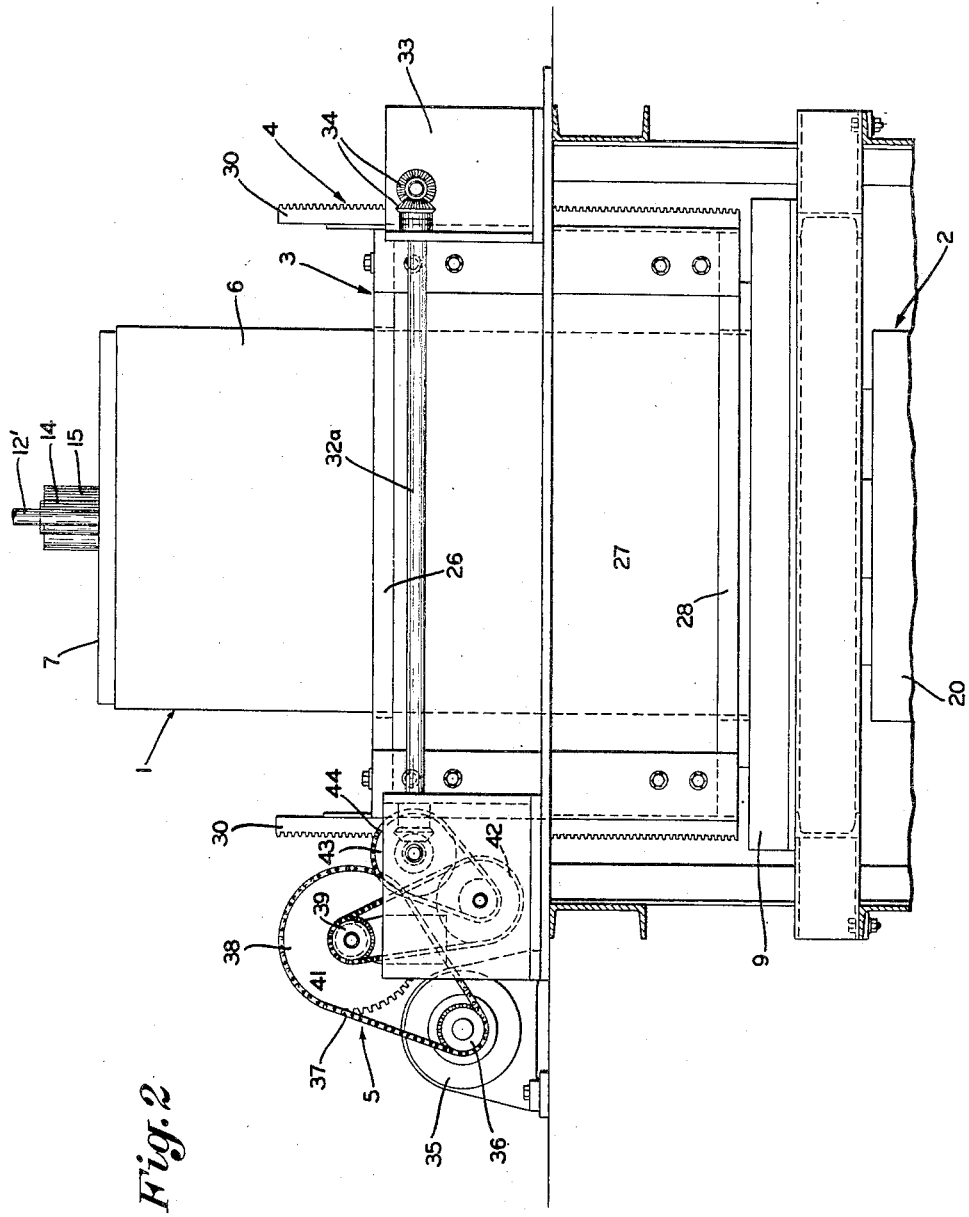
Figure 3:
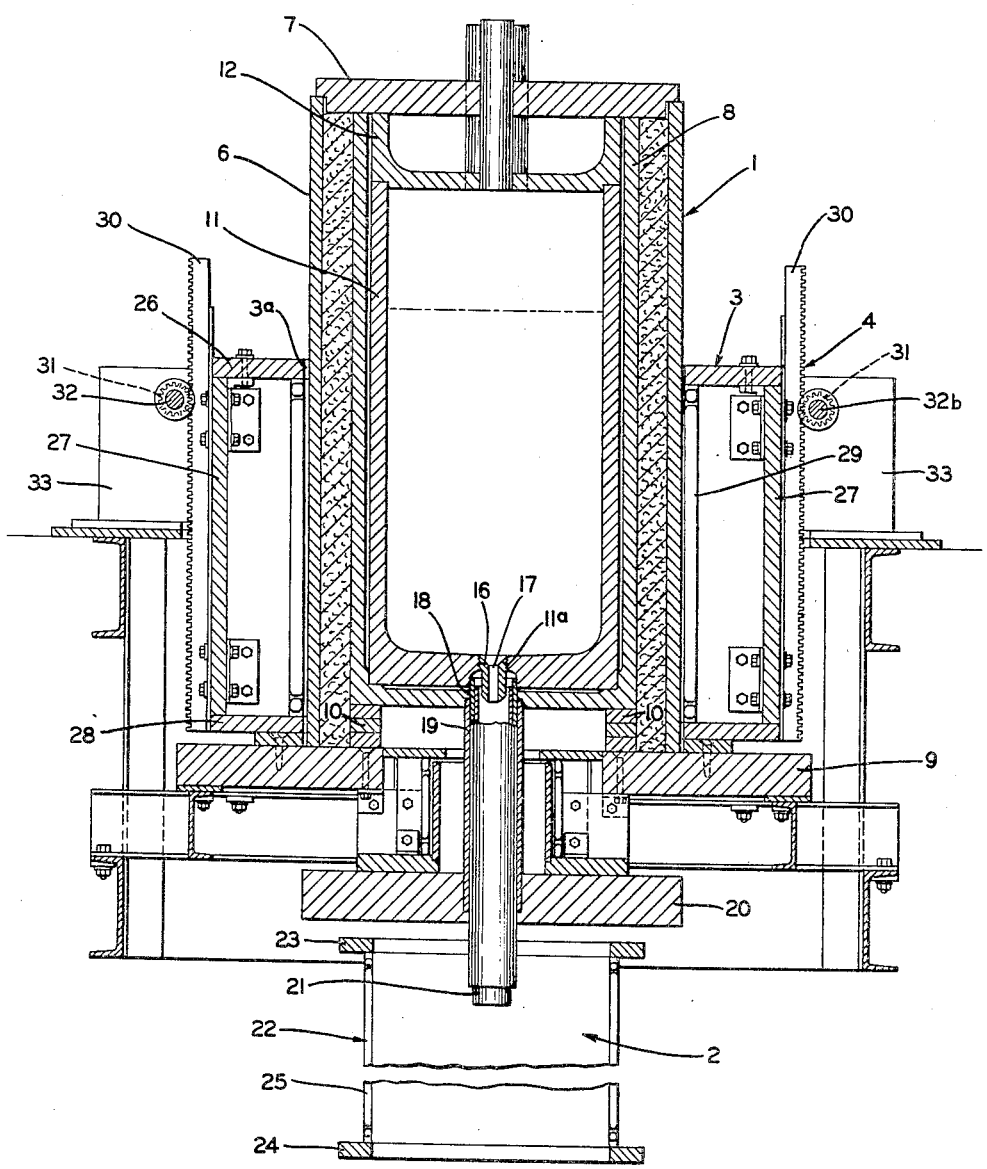
Figure 4:
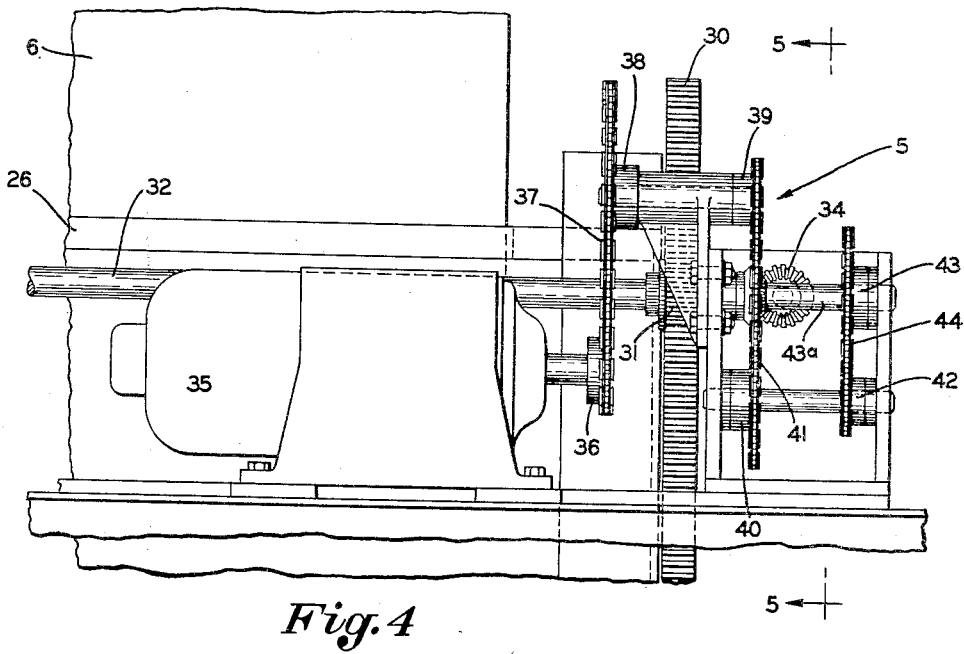
Figure 5:
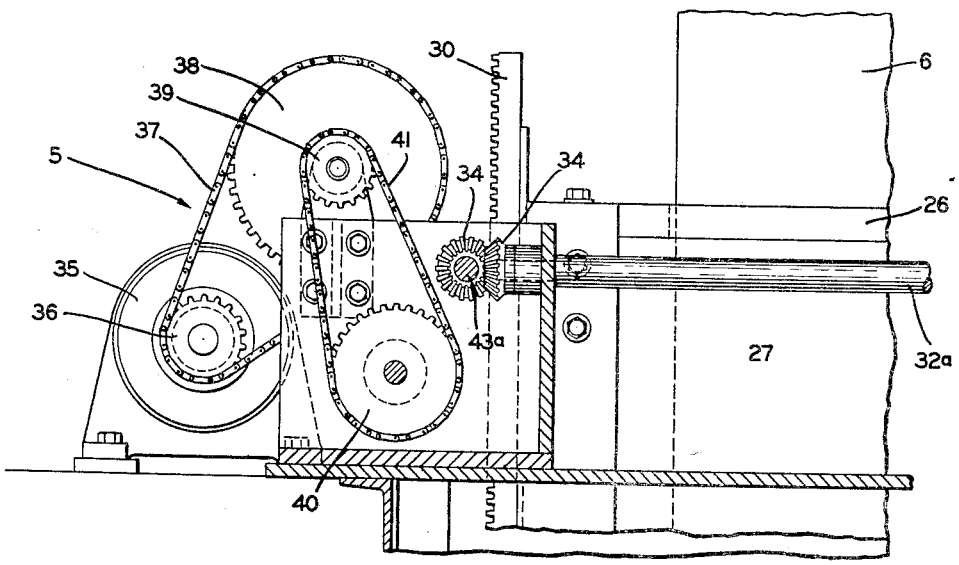

Fig. 2, a front elevation of the improved induction furnace of the present invention, but only partially showing the mold portion;

Fig. 3, a front sectional view looking in the direction of the arrows 3—3 in Fig. 1;

Fig. 4, an enlarged side fragmentary view showing the drive mechanism which reciprocally moves the induction coil; and Fig. 5, an enlarged side fragmentary view partially in section looking in the direction of arrows 5—5 in Fig. 4.

The improvements of the present invention are shown incorporated in a particular type of induction furnace for heating titanium metal, but it should be understood that the improvements in construction and method of heating an induction furnace comprising the present invention are applicable to many different constructions of induction furnaces, and that the apparatus for moving the induction coil could be of a form other than that shown.

Figs. 1, 2 and 3 shows an induction furnace having a heating chamber generally indicated at 1, a mold zone generally indicated at 2, a coil assembly generally indicated at 3, a gear rack and pinion assembly generally indicated at 4 and a drive means generally indicated at 5.

The heating chamber 1 includes an outside shell 6 of heat resistant material preferably Transite, or the like. The shell 6 is a generally vertical hollow cylinder, closed at its upper end by a circular cover 7, also of heat resistant material. Spaced inwardly from the outer shell 6 is another inner heat resistant shell 8 which is preferably formed of graphite. The inner shell is also generally vertically cylindrical in configuration and is closed at its upper end by the same cover 7 of the outer shell 6.

The lower end of the outer shell 6 rests directly on a heat resistant base 9 which is also preferably of Transite material and is supported by the usual structural members. The inner shell 8, however, has integral side and bottom walls and rests on a series of blocks 10 consisting of two layers of heat resistant material such as Transite separated by graphite or carbon blocks.

Thus, a cylindrical space is formed between the shell 6 and the shell 8 as defined by the inward side of the shell 6, the base 9, the blocks 10, and the outward side of the shell 8. This space is filled with preferably Thermex or other high heat resistant material.

Mounted within the inner shell 8 with its lower end resting on the lower surface of the inner shell and with its side walls slightly spaced from the side walls of the inner shell is a cup-shaped graphite crucible 11. The crucible 11 is closed at its uppermost end by a graphite cover member 12, the top portion of which rests against the underside of the cover 7.

Extending through a hole formed in the cover 7 and into a hole formed vertically in the inner shell 8 is a preferably graphite pyrometer sight tube indicated at 12'. Also extending through holes formed in the cover 7 and holes formed in the crucible cover 12 are a vent and sight tube 13, a sight and argon inlet tube 14 and a feed pipe 15, all of preferably graphite material.

Centrally located in the bottom wall of the crucible is a hole 11a, aligned with a similar hole through the bottom of the inner shell 8. Threaded in the upper part of hole 11a in the bottom of the crucible is a graphite plug 16 also having an opening 17 through its central portion. A titanium plug is inserted in hole 17 to seal the bottom of the crucible 11.

Threaded in the lower part of the opening 11a in the bottom of the crucible 11 is a heat resistant tube 18 and threaded to the inner side of the opening in the bottom of the inner shell 8 is a heat resistant tube 19. Tube 19 telescopes over the tube 18 so that the tubes 18 and 19 form a double tube connection extending downwardly from the bottom of the crucible 11 and inner shell 8 to the mold zone 2.

The mold in zone 2 includes a cover plate 20 preferably made from graphite. The sides and bottom of the mold (not shown) are of any desired configuration and fit tightly against the underside of the cover plate 20. The tubes 18 and 19 extend through the center of the cover plate 20 and extend into the confines of the mold. A heat resistant tube 21 also extends into the mold being telescoped within the tube 18.

Surrounding the mold below the cover plate 20 is an induction coil assembly generally indicated at 22. This induction coil assembly 22 includes a top portion 23 and a bottom portion 24 of refractory material preferably Transite or the like. Spanning between the top portion 23 and the bottom portion 24 is the mold heating induction coil 25.

Surrounding the outer sides of the outside shell 6 of the heating chamber is the coil assembly generally indicated at 3. This coil assembly preferably is generally rectangular as viewed from the top and consists of a frame of refractory material such as Transite forming a top portion 26, a side portion 27 and a bottom portion 28. Spanning between the top and bottom portions 26 and 28 and making up the inner wall of the coil assembly is the induction coil 29 of less vertical length than the length of the vertical side walls of the crucible 11, as shown in Fig. 3. The induction coil assembly 3 is mounted over the heating chamber 1 so that it is slightly spaced at 3a from the heating chamber on all sides and can move up and down throughout the vertical length of the heating chamber.

Connected to the outer vertical face of the coil assembly 3 are the gear racks 30 which are mounted at the four corners of the coil assembly 3. Mounted exterior of the coil assembly 3 but engaged in the gear racks 30 are the pinions 31. This gear rack and pinion assembly is preferably metal such as steel.

Pinions 31 are mounted on horizontal shafts 32, 32a and 32b which are located at three sides of the coil assembly 3 (Fig. 1) and are connected to the drive means 5. The shafts 32, 32a and 32b are mounted rotatably in mounting angles 33 and are connected by beveled gears 34 to each other as shown.

Since the gear racks 30 are connected to the coil assembly 3 and the pinions 31, and shafts 32, 32a and 32b are rotatably mounted in the mounting plates 33, as the drive means 5 rotates shaft 32, the shafts 32a and 32b in turn rotate the pinions 31. The pinions, being engaged with the gear racks 30 move the gear racks vertically upward or downward and thus move the coil assembly 3 vertically upward and downward.

The drive means, generally indicated at 5 and best seen in Figs. 1, 4 and 5, consists of a fast reversing electric motor 35 having a sprocket 36 mounted on its shaft. The sprocket 36 is connected by means of a chain 37 to a larger sprocket 38.

Sprocket 38 is mounted on one end of a shaft which shaft has mounted on its other end the smaller sprocket 39, and sprocket 39 is connected to a larger sprocket 40 by means of a chain 41. Sprocket 40 is mounted on one end of the shaft having the smaller sprocket 42 mounted on its other end and sprocket 42 is in turn connected to a larger sprocket 43 by means of a chain 44.

Sprocket 43 is connected to a shaft extension 43a of horizontal shaft 32. Thus, the described speed reduction drive reduces the speed of rotation of the motor to slow speed rack movement so that the speed at which the coil assembly moves vertically upwardly and downwardly is relatively slow.

The particular connection between the electric motor 35 and the horizontal shafts 32 shown in the drawings is merely used to illustrate one form of transmitting the necessary movement and reducing the speed of the same.

It is apparent, however, to those skilled in the art, that many other types of speed reducing or drive means may be used to supply the necessary rotation to the horizontal shafts 32, 32a and 32b.

When an electric motor drive is used to move the induction coil in relation to the crucible, as described above and shown in the drawings, it is necessary to provide the electric motor with control means for automatically reversing the motor or stopping it at a desired point. For instance, an automatically timed reversing switch may be used which automatically and continuously reverses the motor at predetermined intervals. In conjunction with such switch, a suitable manually operated switch is provided to stop the motor when the induction coil is in any desired position.

In operation, the crucible 11 of the induction furnace is filled to a predetermined height with titanium sponge metal and then closed and purged with argon gas so that it contains a pure argon atmosphere. Electric power is supplied to the induction coil 29 and at the same time the induction coil 29 is reciprocably moved upwardly and downwardly around the crucible 11 evenly heating the crucible and its contents.

This is continued until all of the titanium sponge metal but that in the extreme lower portion of the crucible 11 is melted, after which the induction coil 29 is lowered so as to heat the remaining titanium metal within the bottom of the crucible 11. As this last portion of titanium metal is heated above its melting point, it in turn melts the titanium metal plug contained in the opening 17 in the graphite plug 16.

This enables all of the molten titanium to flow out of the crucible 11 down through the tubes 18, 19 and 21 into the mold (not shown) which has been heated by the induction coil assembly 22 and also has been purged with argon so that it also contains a pure argon atmosphere. After all of the molten titanium has flowed from the crucible 11 into the heated mold, the mold is permitted to cool and thereby a solid titanium ingot is formed.

Thus the present invention provides a means for uniformly heating a crucible containing titanium metal by use of a vertically reciprocably moving induction coil which moves throughout the heating cycle to heat a predetermined portion of the crucible, changing all of the titanium contained in the crucible to a molten state except the extreme lower portion. Then, by moving the coil downwardly to heat this lower portion, the entire charge of titanium in the crucible is changed into a molten state after which the entire charge flows into a heated mold.

In this way a means is provided for melting titanium metal which eliminates the hot spots in the crucible by uniformly heating the crucible progressively up and down with a high frequency induction coil. Such a unique method makes it unnecessary to use the high temperatures heretofore required and thus not only reduces the carbon pickup in the molten titanium, but also reduces the heating time and cooling time as well as the amount of argon necessary to maintain an argon atmosphere within the crucible and mold. In this way, also, the crucible life is greatly extended.

The decrease in carbon pickup in the molten titanium has been established by tests made to compare the operation of the old construction of induction furnace and method against the operation of the present construction and method. By use of the old construction and method, the carbon pickup ranged from .7% to 1.5%, and with the new from .25% to .6%. This shows a considerable reduction and results in a greatly improved final product.

In the foregoing description, certain terms have been used for brevity, clearness and understanding but no unnecessary limitations are to be implied therefrom, because such words are used for descriptive purposes herein and are intended to be broadly construed.

Moreover, the embodiments of the improved construction and method illustrated and described herein is by way of example and the scope of the present invention is not limited to the exact details of construction shown.

Having now described the invention, the construction, operation and use of a preferred embodiment thereof, and the advantageous new and useful results obtained thereby, the new and useful construction and method and reasonable mechanical equivalents thereof, obvious to those skilled in the art, are set forth in the appended claims.

I claim:

1. Induction furnace construction for melting titanium including a crucible, an induction coil surrounding the crucible, means for continuously reciprocally moving the induction coil in relation to the crucible at a first zone of said crucible, and means for selectively moving said induction coil to a second zone of the crucible.

2. Induction furnace construction for melting titanium including a vertical crucible, an induction coil laterally encircling the crucible, means for continuously reciprocally moving the induction coil in relation to the crucible, and means for selectively stopping movement of said induction coil at a desired vertical position.

3. Induction furnace construction including a vertical graphite crucible having a hole formed in its bottom wall, a titanium metal plug mounted in said opening, an induction coil laterally encircling the crucible, a rectangular heat resistant frame mounting said coil, vertical gear racks mounted at the corners of said frame, gear pinions rotatably mounted exterior of said frame and engaged with said gear racks, motor means, speed reducing drive means connecting said motor means and said pinions for rotating said gear pinions, control means operative in one position to reverse the motor means during a continuous operation cycle, and operative in another position to stop the motor; whereby titanium metal may be placed in the crucible and therein heated by reciprocably vertically moving the induction coil until molten, and whereby the induction coil may then be moved to a stationary position surrounding the extreme lower portion of the crucible and the titanium there contained melted to melt the titanium plug in the bottom of the crucible thereby permitting the molten titanium in the crucible to flow from the crucible through said previously plugged hole.

4. The method of heating an induction furnace having a movable induction coil and a graphite crucible surrounded by the coil including the steps of supplying power to said coil to induce a current in the wall portions of the crucible surrounded by the coil, and continuously reciprocably moving the coil axially of the crucible to continuously change the crucible wall portion heated; thereby heating the crucible evenly and efficiently and minimizing the possibility of producing hot spots in the crucible wall.

5. The method of melting titanium metal in an induction furnace having a vertical graphite crucible with a hole formed in its bottom wall and with a titanium metal plug in said hole, said furnace also having an induction coil laterally encircling the crucible; including the steps of continuously vertically reciprocably moving the induction coil in relation to the graphite crucible axially of a predetermined upper portion of the crucible to melt titanium in said upper crucible portion, then positioning the induction coil at a stationary position at the lower portion of the crucible to melt the remaining titanium contained therein, then melting the titanium plug by the heat of the molten titanium in the crucible, and then flowing the molten titanium through the opening in the bottom wall to a mold.

6. Induction furnace construction for melting titanium including a crucible having a hole formed in a wall thereof, a titanium metal plug mounted in said opening, an induction coil laterally encircling the crucible, means for continuously reciprocally moving the induction coil in relation to the crucible at a zone spaced from said titanium plug, and means for selectively moving said induction coil to the zone of said titanium plug.

7. Induction furnace construction for melting titanium including a vertical crucible having side and bottom walls and a hole formed in its bottom wall, a titanium metal plug mounted in said opening, an induction coil laterally encircling the crucible having a vertical length less than the vertical length of the crucible side walls, means for continuously reciprocally moving the induction coil in relation to the crucible at a zone spaced upwardly from said titanium plug, and means for selectively moving said induction coil to the zone of the titanium plug and stopping movement of said induction coil adjacent said zone.

References Cited in the file of this patent

UNITED STATES PATENTS

| | | |
|---|---|---|
| 1,068,558 | Bally | July 29, 1913 |
| 1,197,042 | Ludwick | Sept. 5, 1916 |
| 1,734,536 | Sorrel et al. | Nov. 5, 1929 |
| 1,747,934 | Heidenhain | Feb. 18, 1930 |
| 1,812,172 | Rohn | June 30, 1931 |
| 1,897,589 | Reeve | Feb. 14, 1933 |
| 2,573,319 | Dreyfus et al. | Oct. 30, 1951 |
| 2,686,864 | Wroughton et al. | Aug. 17, 1954 |
| 2,686,865 | Kelly | Aug. 17, 1954 |